United States Patent [19]

Smith

[11] 4,070,894
[45] Jan. 31, 1978

[54] CRIMPING DEVICE

[76] Inventor: Jackson A. Smith, 5443 Rand Road, Bradner, B. C., Canada

[21] Appl. No.: 736,352

[22] Filed: Oct. 27, 1976

[30] Foreign Application Priority Data

Aug. 6, 1976 Canada .................................. 258609

[51] Int. Cl.² ........................................... B21D 37/00
[52] U.S. Cl. ....................................... 72/292; 29/237; 29/508
[58] Field of Search ................... 72/292; 29/237, 508, 29/747, 751, 753, 761, 818, 515, 516, 517

[56] References Cited

U.S. PATENT DOCUMENTS

| | | | |
|---|---|---|---|
| 1,950,678 | 3/1934 | Hogan | 72/292 |
| 2,342,397 | 2/1944 | Harley | 72/292 |
| 2,483,659 | 10/1949 | Miller | 29/237 |
| 2,562,055 | 7/1951 | Miller | 72/292 |
| 3,823,597 | 7/1974 | Hanback et al. | 29/237 |

*Primary Examiner*—Michael J. Keenan

*Attorney, Agent, or Firm*—Cushman, Darby & Cushman

[57] ABSTRACT

A device for circumferentially crimping a tubular cable puller onto a free end of a cable, said crimping device comprising a base adapted for securement to the body of a fluid actuator; a holder for said tubular puller and adapted for securement to the piston rod of said actuator whereby linear movement of the actuator piston relative to the body thereof effects relative movement between the base and the holder; a wire rope secured at each of its ends to said base and extending into and looping within the confines of said holder; said holder having a semi-circular seat to accommodate the outside diameter of said tubular puller and a groove in said seat to receive a portion of the loop of the wire rope; the seat of said holder having a diameter equal to the outside diameter of the tubular puller; said wire rope looping 360° around said tubular puller and circumferentially crimping the same in response to said base being drawn away from said holder by operation of said actuator.

3 Claims, 4 Drawing Figures

CRIMPING DEVICE

This invention relates to the connection of tubular cable pullers to the free end of cables such as communication cables and in particular to a device for circumferentially crimping such pullers onto cable ends.

Crimping tools are known as shown for example in U.S. Pat. No. 3,750,453 of Aug. 7, 1973 but such tools are complicated, expensive to manufacture and require frequent servicing due to their substantial number of moving parts.

The present invention provides a crimping device which can quickly and easily install tubular pulling eyes onto cable ends in the field. The device according to the invention has few parts and is easily transported and operated.

In accordance with a broad aspect, the invention relates to a device for circumferentially crimping a tubular cable puller onto a free end of a cable, said crimping device comprising a base adapted for securement to the body of a fluid actuator;

a holder for said tubular puller and adapted for securement to the piston rod of said actuator whereby linear movement of the actuator piston relative to the body thereof effects relative movement between the base and the holder;

a wire rope secured at each of its ends to said base and extending into and looping within the confines of said holder;

said holder having a semi-circular seat to accommodate the outside diameter of said tubular puller and a groove in said seat to receive a portion of the loop of the wire rope;

the seat of said holder having a diameter equal to the outside diameter of the tubular puller;

said wire rope looping 360° around said tubular puller and circumferentially crimping the same in response to said base being drawn away from said holder by operation of said actuator.

The invention is illustrated by way of example in the accompanying drawings wherein.

Figure 3:
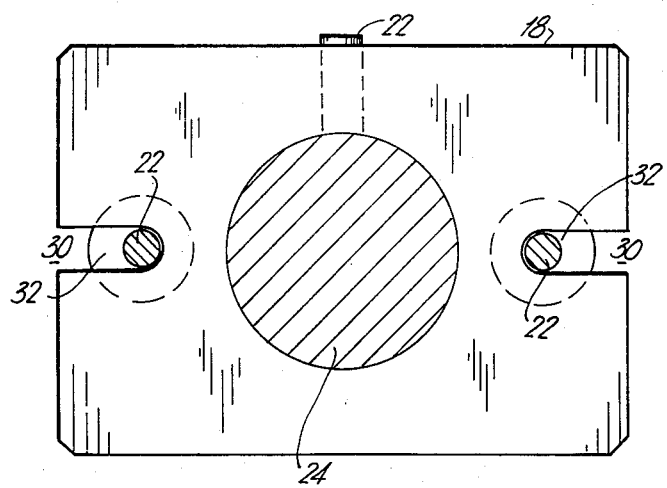
FIG. 3 is a perspective view of the device illustrating a crimping operation.
Figure 4:
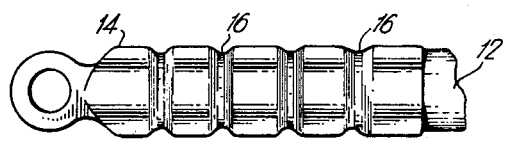
FIG. 4 shows a pulling eye crimped onto the end of a communication cable.

Referring to the drawings, the crimping device 10 is adapted to receive therein a cable end 12 with a pulling connector or eye 14 thereon and circumferentially crimp the eye 14 onto the cable end as shown in FIG. 3. As shown in FIG. 4, the wall of the eye 14 is crimped inwardly in several positions along its length to produce a plurality of concentric contoured gripping rings 16 thereby containing 100% of the cable conductors in the eye 14, keeping the cable end pressurized and moisture sealed.

Figure 1:
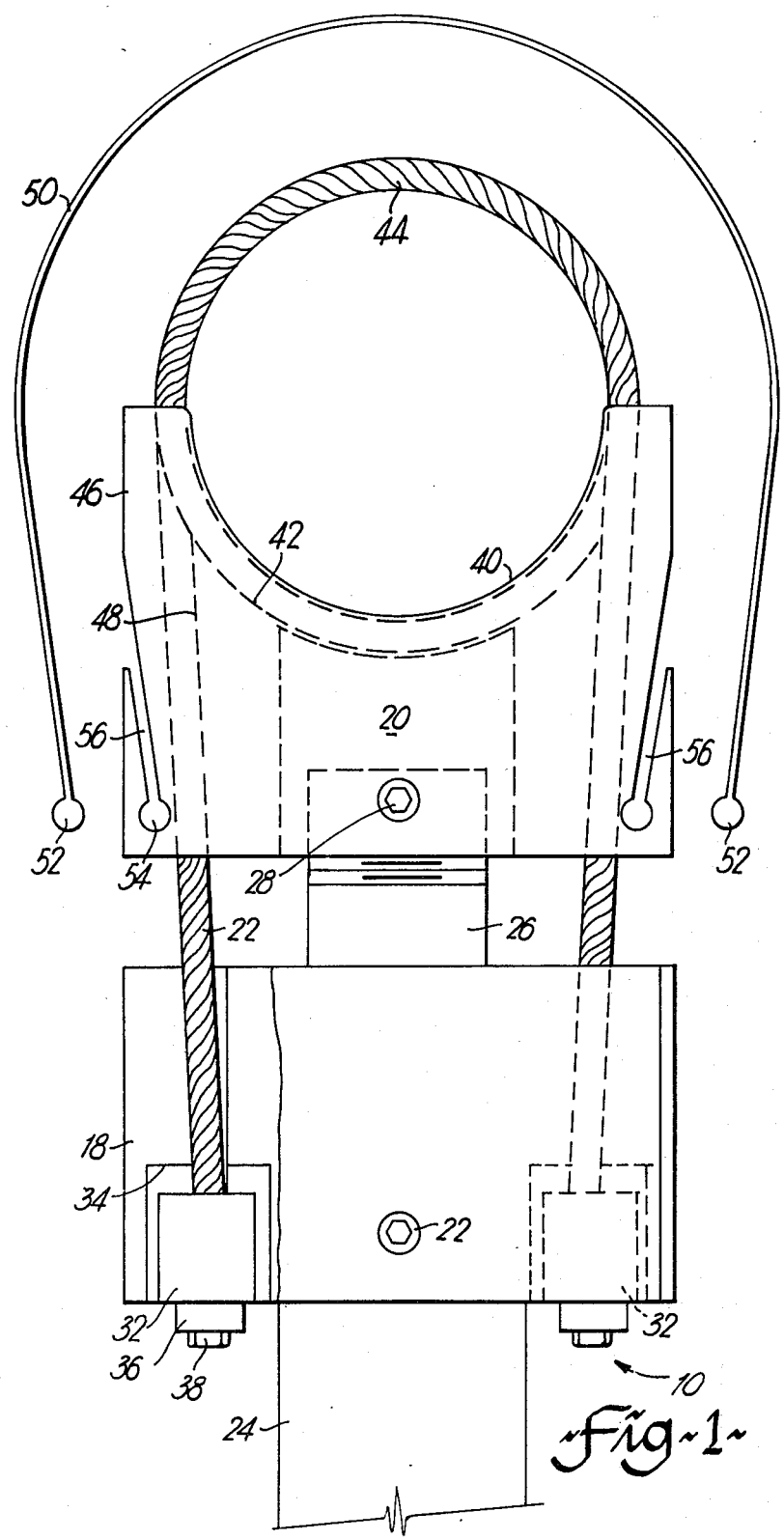
FIG. 1 is a side elevation view, partly sectioned of the device of the invention.

Turning now to FIG. 1, the device 10 includes a base 18 and a holder 20 interconnected by a length of wire rope 22 which is connected at each of its ends to the base 18 and which extends into and is looped within the holder 20 as shown. Briefly, the tubular puller on the end of the cable 12 is placed within the loop on the holder and by moving the base 18 relative to the holder 20, the loop of the wire rope is circumferentially drawn around the outside of the tube to effect the crimp 16. The crimping device is adapted for operation with linear hydraulic or air operated actuator which provides the necessary force to move the base 18 relative to the holder 20. As shown in FIG. 1, the base 18 is threadably or otherwise firmly secured to the upper body of the actuator and one or more safety set screws 22 are provided to lock the base onto the actuator body 24. The piston rod 26 of the actuator extends up through the aperture in the base and is threadably secured in the holder 20 and is positionally fixed by means of another set screw 28.

The sides of the base 18 are grooved as at 30 to receive the wire rope 22 and the ends of the latter are secured in metal plugs 32 which seat in sockets 34 of the base. If desired, the rope ends may also be further secured by means of a retaining strap 36 and cap screws 38.

The holder 20 has an arcuate seat 40 of the same diameter as that of the pulling eye 14 to be crimped therein. Obviously, a full range of holders is provided to meet the various diameters of cable and pulling eye involved. The seat 40 is provided with a central groove 42 to accommodate the lower run of the loop 44 of the wire rope 22. Additionally, the sides 46 of the holder 20 are provided with vertically oriented grooves 48 also to accommodate the wire rope 22.

Figure 2:
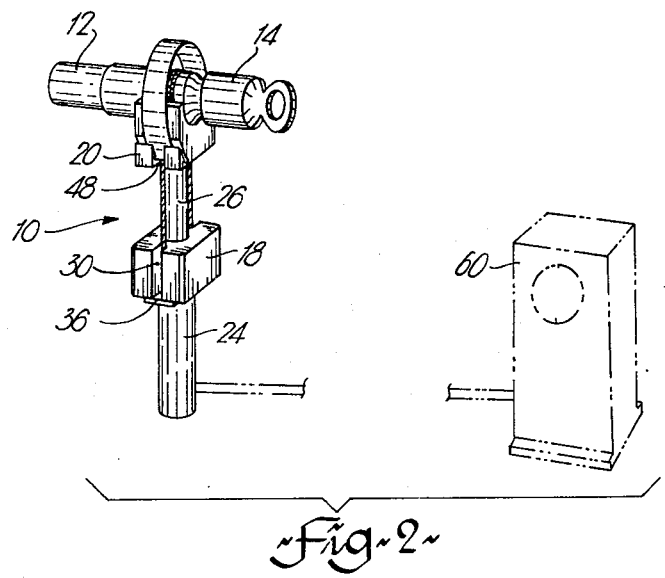
FIG. 2 is a plan view of the base of the device, viewed along the lines 2—2 of FIG. 1.

As shown in FIGS. 1 and 2, a shield or guard 50 is provided to dissipate any outward force of the wire rope in case of breakage thereof. The guard 50 as shown in FIG. 2 is wide enough to substantially cover the width of the crimping groove 16 in the tube 14 and the end of the guard is provided with lugs 52 which seat in profiled apertures 54 provided in the bottom of slots 56 in the sidewalls of the body as shown in FIG. 2.

Referring to FIG. 2, the crimper 10 including the actuator 24 may advantageously be connected with an electric hydraulic pump 60.

It will be evident from FIG. 2 that with the holder 20 and base 18 drawn towards one another by relaxation of the actuator 24, the tubular puller on the end of the cable 12 can be placed onto the seat 40 of the holder, within the confines of the wire loop 44. Operation of the actuator 24 by means of the pump 60 or the like forces the holder 20 upward with regard to the base 18 and the wire loop 44 circumferentially tightens about the tube 14 effecting the groove 16 shown in FIG. 4.

It will be appreciated that while the present invention has been described in connection with a specific embodiment thereof and in a specific use, various modifications thereof will occur to those skilled in the art without departing from the spirit and scope of the invention as laid down in the following claims.

The terms and expressions which have been used in this disclosure are used as terms of description and not of limitation and there is no intention in the use of these terms and expressions to exclude any equivalents of the features shown and described or portions thereof but it is recognized that various modifications are possible within the scope of the invention as claimed.

I claim:

1. A device for circumferentially crimping a tubular cable puller onto a free end of a cable, said criming device comprising a base adapted for securement to the body of a fluid actuator;

a holder for said tubular puller and adapted for securement to the piston rod of said actuator whereby linear movement of the actuator piston relative to the body thereof effects relative movement between the base and the holder; and a wire rope secured at each of its ends to said base and extending into and looping within the confines of said holder;

said holder having a semi-circular seat to accommodate a linear portion of the outside diameter of said tubular puller so as to retain it normal to said holder during a crimping operation and a groove in said seat to receive a portion of the loop of the wire rope;

the seat of said holder having a diameter equal to the outside diameter of the tubular puller;

said wire rope looping 360° around said tubular puller and circumferentially crimping the same in response to said base being drawn away from said holder by operation of said actuator.

2. A crimping device according to claim 1 including grooves in the sides of said base and holder to partially enclose said wire rope.

3. A crimping device according to claim 1 including a shield guard removably secured at each end of said holder and extending around and outwardly of said loop to dissipate outward force of said wire in case of breakage thereof.

* * * * *